(12) United States Patent
Akimoto (10) Patent No.: US 10,563,536 B2
(45) Date of Patent: Feb. 18, 2020

(54) VARIABLE NOZZLE MECHANISM USED FOR TURBOCHARGER

(71) Applicant: KABUSHIKI KAISHA TOYOTA JIDOSHOKKI, Kariya-shi, Aichi-ken (JP)

(72) Inventor: Kenta Akimoto, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 333 days.

(21) Appl. No.: 15/469,632

(22) Filed: Mar. 27, 2017

(65) Prior Publication Data
US 2017/0276019 A1    Sep. 28, 2017

(30) Foreign Application Priority Data

Mar. 28, 2016 (JP) .................. 2016-064341
Mar. 23, 2017 (JP) .................. 2017-057526

(51) Int. Cl.
*F01D 17/16* (2006.01)
*F02B 37/24* (2006.01)

(52) U.S. Cl.
CPC .......... *F01D 17/165* (2013.01); *F01D 17/16* (2013.01); *F02B 37/24* (2013.01);
(Continued)

(58) Field of Classification Search
CPC ...... F01D 17/14; F01D 17/141; F01D 17/143; F01D 17/16; F01D 17/162; F01D 17/165; F04D 27/002; F04D 29/46; F04D 29/462; F04D 29/56; F04D 29/563; F02B 37/22; F02B 37/24; F05D 2220/40; F05D 2250/90; F05D 2260/4031
(Continued)

(56) References Cited

U.S. PATENT DOCUMENTS 4,659,295 A    4/1987 Burdette et al.
6,699,010 B2 *  3/2004 Jinnai ............... F01D 17/16
                                          415/164
(Continued)

FOREIGN PATENT DOCUMENTS

DE    10-2004-043928 A1    4/2006
DE       102012218138 A1    4/2014
(Continued)

*Primary Examiner* — Kenneth J Hansen
*Assistant Examiner* — Justin A Pruitt
(74) *Attorney, Agent, or Firm* — Sughrue Mion, PLLC (57) ABSTRACT

There is provided a variable nozzle mechanism that can suppress wear. The variable nozzle mechanism includes a plurality of nozzle vanes, a plurality of arms, and a unison ring. The plurality of nozzle vanes are provided in the nozzle path. The plurality of arms each have a pivoted end and a free end, and the pivoted end is integrally coupled with the nozzle vane by means of a pivot. The unison ring is provided with a plurality of grooves. Each groove is engaged with the respective free end of the arm. The free end of the arm has a closing-side contact surface and an opening-side contact surface each in contact with a respective one of paired walls forming the groove of the unison ring. The closing-side contact surface has a curvature different between a side closer to the pivot and a side farther away from the pivot.

3 Claims, 6 Drawing Sheets

(52) U.S. Cl.
CPC ...... *F05D 2220/40* (2013.01); *F05D 2250/90* (2013.01); *F05D 2260/4031* (2013.01); *Y02T 10/144* (2013.01)

(58) Field of Classification Search
USPC ........................................................ 415/164
See application file for complete search history.

(56) References Cited

U.S. PATENT DOCUMENTS

| | | | |
|---|---|---|---|
| 2009/0022581 A1* | 1/2009 | Tries | F01D 17/165 415/163 |
| 2011/0097197 A1 | 4/2011 | Woo et al. | |
| 2011/0138805 A1 | 6/2011 | Barthelet et al. | |
| 2014/0341719 A1 | 11/2014 | Uesugi et al. | |
| 2015/0118028 A1 | 4/2015 | Metz et al. | |

FOREIGN PATENT DOCUMENTS

| | | |
|---|---|---|
| EP | 2395212 A1 | 12/2011 |
| JP | 59-70035 U | 5/1984 |
| JP | 2014-224498 A | 12/2014 |
| WO | 2010120028 A1 | 10/2010 |

* cited by examiner

VARIABLE NOZZLE MECHANISM USED FOR TURBOCHARGER

This nonprovisional application is based on Japanese Patent Application No. 2016-064341 filed on Mar. 28, 2016, and Japanese Patent Application No. 2017-057526 filed on Mar. 23, 2017, with the Japan Patent Office, the entire contents of which are hereby incorporated by reference.

BACKGROUND OF THE INVENTION

Field of the Invention

The present invention relates to a variable nozzle mechanism used for a turbocharger.

Description of the Background Art

A turbocharger blows exhaust gas in a scroll path to a turbine wheel to rotatably drive the turbine wheel. Conventionally, in order to make a characteristic of the turbocharger variable, a variable nozzle mechanism is adopted in the turbocharger. The variable nozzle mechanism has a plurality of nozzle vanes moved to increase/decrease an area in cross section of a channel of exhaust gas to thus control a velocity of flow of exhaust gas blown to the turbine wheel.

Japanese Patent Laying-Open No. 2014-224498 proposes a variable nozzle mechanism in which an arm fit-engagement groove in which an arm of a variable nozzle engages is formed in a unison ring and the arm fit-engagement groove has a closing-side groove wall surface formed in a concave, arcuate shape and an opening-side groove wall surface formed in a convex, arcuate shape.

Japanese Patent Laying-Open No. 2014-224498 discloses that, of a wall surface of the arm fit-engagement groove, the closing-side groove wall surface normally contacting the arm as exhaust reaction force acts is formed in the concave, arcuate shape to reduce contact stress between the closing-side groove wall surface and the arm and hence wear on the arm and the closing-side groove wall surface. However, in order to suppress delayed supercharging or poor exhaust due to a nozzle vane's impaired positional precision, there is a demand for a variable nozzle mechanism for further reduction of wear on the arm and the unison ring, and conventional variable nozzle mechanisms are not necessarily sufficient and have room for improvement.

SUMMARY OF THE INVENTION

An object of the present invention is to provide a variable nozzle mechanism which can suppress wear on an arm and a unison ring.

A variable nozzle mechanism according to the present invention is used for a turbocharger which varies exhaust gas blown to a turbine wheel through a nozzle path. The variable nozzle mechanism comprises a plurality of nozzle vanes, a plurality of arms, and a unison ring. The plurality of nozzle vanes are provided in the nozzle path. The plurality of arms each have a pivoted end and a free end, and the pivoted end is integrally coupled with the nozzle vane by means of a pivot. The unison ring is provided with a plurality of grooves. Each groove is engaged with the respective free end of the arm. When the unison ring rotates in both an opening direction to increase a cross sectional area of the nozzle path and a closing direction to decrease the cross sectional area of the nozzle path the arm and the nozzle vane are capable of rotating integrally about an axis of the pivot in the opening direction and the closing direction to vary the cross sectional area of the nozzle path. The free end of the arm has a pair of contact surfaces on a side on which the arm rotates in the closing direction and a side on which the arm rotates in the opening direction. The paired contact surfaces are each in contact with a respective one of paired walls forming the groove of the unison ring. One of the contact surfaces of the arm forms a curved surface convexed toward a wall surface of the groove of the unison ring and has a curvature different between a side of the convex curved surface closer to the pivot and a side of the convex curved surface farther away from the pivot.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention will now be described in embodiments hereinafter in detail with reference to the drawings. In the figures, identical or corresponding components are identically denoted and will not be described repeatedly.

Figure 1:
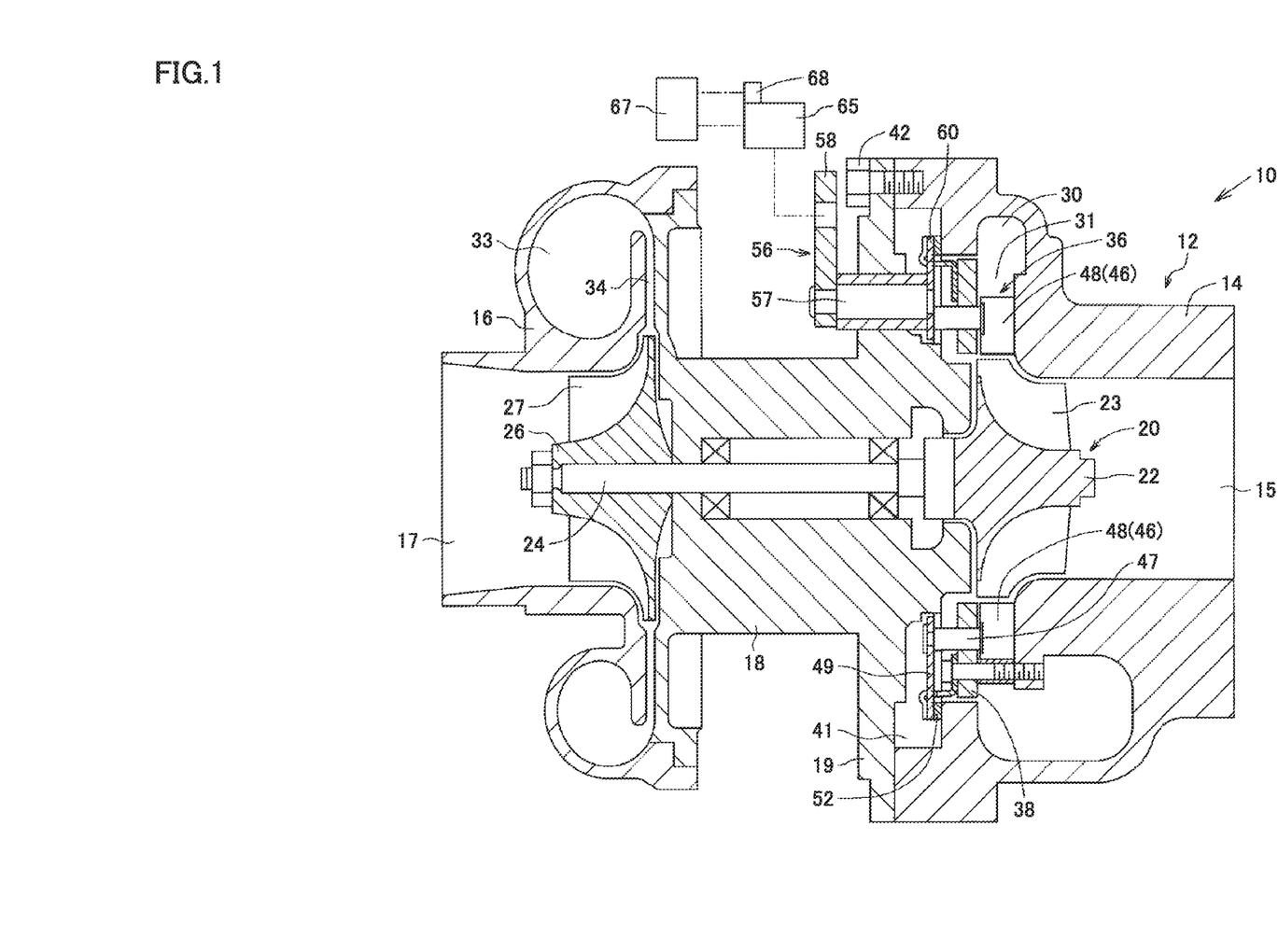
FIG. 1 is a cross section of a variable nozzle turbocharger taken along an axis of rotation thereof.

Initially, a variable nozzle turbocharger 10 is generally described in structure. Note that in the present embodiment the variable nozzle turbocharger 10 attached to an internal combustion engine mounted in a vehicle will be described as an example. FIG. 1 is a cross section taken along the axis of rotation of the variable nozzle turbocharger 10.

As shown in FIG. 1, the variable nozzle turbocharger 10 includes a rotor 20. The rotor 20 is rotatably accommodated in a rotor housing 12. The rotor housing 12 has three housings, i.e., a turbine housing 14, a compressor housing 16, and a center housing 18. The center housing 18 couples the turbine housing 14 and the compressor housing 16.

The rotor 20 includes a turbine wheel 22, a rotor shaft 24, and a compressor wheel 26. The turbine wheel 22, the rotor shaft 24, and the compressor wheel 26 can rotate together.

The turbine wheel 22 is disposed in the turbine housing 14. The turbine wheel 22 has a circumferential portion with a plurality of turbine blades 23.

The rotor shaft 24 is formed with the turbine wheel 22 integrally. The rotor shaft 24 is disposed in the center housing 18. The rotor shaft 24 is rotatably supported by a plurality of bearings in the center housing 18.

The compressor wheel 26 is disposed in the compressor housing 16. The compressor wheel 26 is attached to a tip of the rotor shaft 24. The compressor wheel 26 has a circumferential portion with a plurality of impellers 27.

A spiral scroll path 30 and a nozzle path 31 are formed in the turbine housing 14. The nozzle path 31 is open in the scroll path 30. The nozzle path 31 faces the turbine blades 23 of the turbine wheel 22. The scroll path 30 is in communication with an exhaust path for exhaust gas discharged from a combustion chamber of an internal combustion engine (not shown). After flowing into the scroll path 30, the exhaust gas is blown from the nozzle path 31 toward the turbine blades 23 of the turbine wheel 22 to rotate turbine wheel 22. Thereafter, the exhaust gas is discharged from an exhaust port 15 of the turbine housing 14.

A spiral compressor path 33 and a diffuser path 34 are formed in the compressor housing 16. The diffuser path 34 is open in the compressor path 33. The diffuser path 34 faces the impeller 27 of the compressor wheel 26. The compressor path 33 is in communication with the combustion chamber of the internal combustion engine via an intake path (not shown). As the turbine wheel 22 rotates, the compressor wheel 26 rotates together. The compressor wheel 26 compresses via the impeller 27 the intake air introduced from an intake air inlet 17 of the compressor housing 16, and sends it out centrifugally to the diffuser path 34. The air discharged into the diffuser path 34 is supercharged to the combustion chamber of the internal combustion engine via the compressor path 33.

The variable nozzle turbocharger 10 includes a variable nozzle mechanism 36. The variable nozzle mechanism 36 controls a velocity of a flow of exhaust gas passing through the nozzle path 31 toward the turbine wheel 22. The variable nozzle mechanism 36 has an annular nozzle ring 38. The nozzle ring 38 constitutes a side wall of the nozzle path 31 on the side of the center housing 18. The nozzle ring 38 is fixed to the turbine housing 14 by a plurality of (e.g., four) connection bolts.

An annular space portion 41 is formed at an outer peripheral portion of a joint part between the turbine housing 14 and the center housing 18. The annular space portion 41 and the nozzle path 31 are divided by the nozzle ring 38. The center housing 18 has an outer peripheral portion provided with a side wall portion 19 in the form of a flange. The side wall portion 19 configures a side wall of the annular space portion 41. The side wall portion 19 is fixed to the turbine housing 14 by bolts 42.

Figure 2:
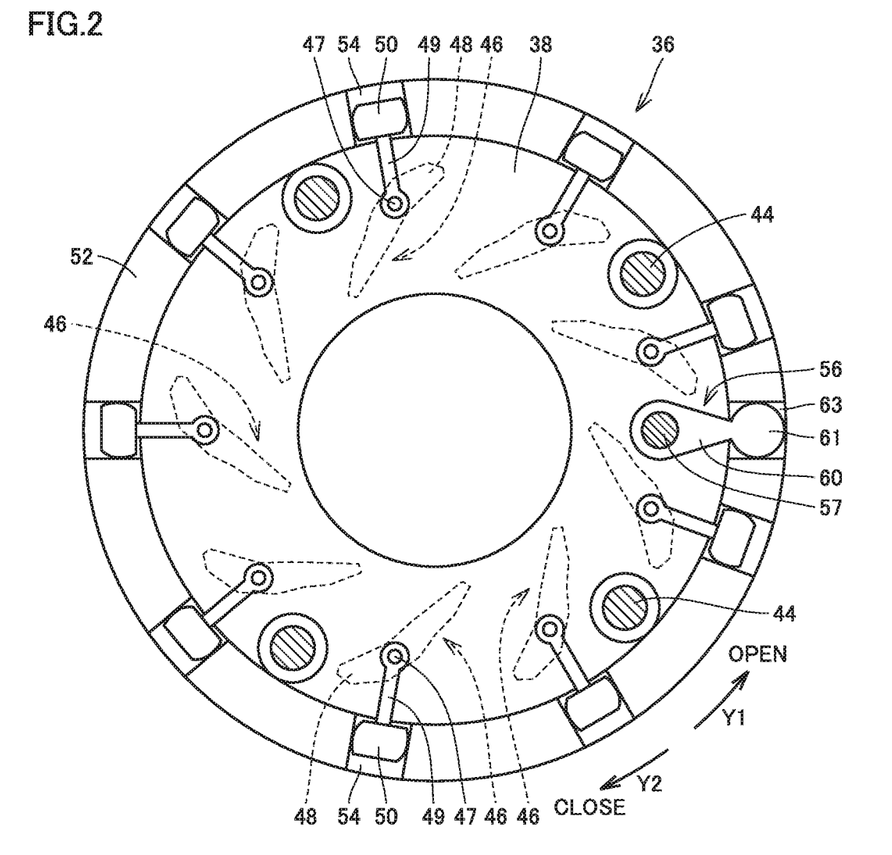
FIG. 2 is a schematic side view of the variable nozzle mechanism as observed from a left side of FIG. 1.

The variable nozzle mechanism 36 is generally configured, as will be described hereinafter. FIG. 2 is a schematic side view of the variable nozzle mechanism 36 observed from a left side of FIG. 1. FIG. 2 shows a state in which a portion of the variable nozzle mechanism 36 (the nozzle ring 38 etc.) is observed on the side of an arm (i.e., a left side of FIG. 1).

As shown in FIG. 2, the variable nozzle mechanism 36 comprises a variable nozzle unit having a plurality of (e.g., nine) variable nozzle members 46. The variable nozzle members 46 are arranged circumferentially with respect to the nozzle ring 38 equidistantly. Each variable nozzle member 46 has a pivot 47, a nozzle vane 48 and an arm 49. The nozzle vane 48 is fixed to one end of the pivot 47. The arm 49 is fixed to the other end of the pivot 47. The nozzle vane 48 is coupled with the arm 49 via the pivot 47 in a fixed manner.

The pivot 47 penetrates the nozzle ring 38 and is thus disposed. The pivot 47 is supported with respect to the nozzle ring 38 rotatably about its own axis. The variable nozzle member 46 is supported on the nozzle ring 38 rotatably by the pivot 47. The arm 49 of each variable nozzle member 46 has a pivoted end supported by the pivot 47 and a free end opposite to the pivoted end. A fit-engagement portion 50 is formed at the free end of each arm 49. Each nozzle vane 48 is disposed in the nozzle path 31 shown in FIG. 1 rotatably about pivot 47. The nozzle vanes 48 can open and close the nozzle path 31. Each arm 49 is disposed in the annular space portion 41 shown in FIG. 1 rotatably about the pivot 47.

The variable nozzle mechanism 36 includes an annular unison ring 52. The unison ring 52 is disposed in the annular space portion 41 shown in FIG. 1. The unison ring 52 is arranged concentrically with the nozzle ring 38. The unison ring 52 is arranged closer to the side wall portion 19 of the center housing 18 than the nozzle ring 38. The unison ring 52 is arranged between the nozzle ring 38 and the arms 49 of the variable nozzle members 46, as shown in FIG. 1.

Retaining rollers 44 are arranged on a side of the nozzle ring 38 facing the annular space portion 41. Each of the retaining rollers 44 is rotatably mounted on the nozzle ring 38. The retaining rollers 44 retain the unison ring 52 rotatably. The unison ring 52 is rotatably retained by the retaining rollers 44 with respect to turbine housing 14.

As shown in FIG. 2, the unison ring 52 has one side surface (i.e., a side provided with the arms 49 of the variable nozzle members 46) provided with the same number of arm fit-engagement grooves 54 as that of the variable nozzle members 46 circumferentially and equidistantly. The arm fit-engagement groove 54 is formed straight in a radial direction of the unison ring 52. The arm 49 of each variable nozzle member 46 has a fit-engagement portion 50 fitted in each arm fit-engagement groove 54. The arm 49 of the variable nozzle member 46 is engaged with the arm fit-engagement groove 54 of the unison ring 52.

A drive member 56 is provided on the side wall portion 19 of the center housing 18 shown in FIG. 1 for driving the unison ring rotatably. The drive member 56 has a pivot 57, a drive lever 58, and a drive arm 60. The drive lever 58 is fixed to one end of the pivot 57. The drive arm 60 is fixed to the other end of the pivot 57.

The pivot 57 penetrates the side wall portion 19 of the center housing 18. The pivot 57 is rotatably supported on the side wall portion 19. The drive member 56 is supported on the side wall portion 19 of the center housing 18 by the pivot 57 rotatably. The drive lever 58 is disposed outside the annular space portion 41. The drive arm 60 is accommodated in the annular space portion 41. A round fit-engagement portion 61 is formed at a tip of the drive arm 60.

As shown in FIG. 2, the unison ring 52 has one side surface (i.e., a side provided with the arms 49 of the variable nozzle members 46) provided with a single drive arm fit-engagement groove 63. The drive arm fit-engagement groove 63 is formed between a pair of the arm fit-engagement grooves 54 adjacent in the circumferential direction of unison ring 52. The drive arm fit-engagement groove 63 is formed straight in the radial direction of the unison ring 52. The drive arm 60 has a fit-engagement portion 61 fitted in the drive arm fit-engagement groove 63. The drive arm 60 is engaged with the drive arm fit-engagement groove 63 of the unison ring 52.

As shown in FIG. 1, the output portion (not shown) of an actuator 65 is connected to the drive lever 58. The actuator 65 may consist, for example, of an electric motor, an electromagnetic solenoid, or an air cylinder. Between the output portion of the actuator 65 and the drive arm 60 of the drive member 56, there may be provided a power transmission mechanism such as a link mechanism or a gear mechanism.

The actuator 65 is drive-controlled by a controller 67. The actuator 65 is provided with an operation amount detection means 68 such as an angle sensor for detecting an amount of an operation of the output portion. Based on the output of the operation amount detection means 68, the controller 67 calculates the rotation angle, i.e., the opening degree, of the nozzle vanes 48.

When the controller 67 operates the actuator 65, the drive lever 58 is rotated. The drive arm 60 rotates with the drive lever 58 about the pivot 57. As the drive arm 60 rotates, the unison ring 52 rotates. As the unison ring 52 rotates, the plurality of variable nozzle members 46 are synchronously rotated.

When the unison ring 52 rotates counterclockwise in FIG. 2 (see an arrow Y1), the variable nozzle members 46 all rotate counterclockwise in FIG. 2 about the axes of the pivots 47. Then, adjacent nozzle vanes 48 move in a direction away from each other. As the nozzle vanes 48 move, an area in cross section of the nozzle path 31 or a channel of exhaust gas between the adjacent nozzle vanes 48 is made larger. The direction of rotation of the arm 49 about the pivot 47 to enlarge the cross sectional area of the nozzle path 31 will hereinafter be referred to as an opening direction.

When the unison ring 52 rotates clockwise in FIG. 2 (see an arrow Y2), the variable nozzle members 46 all rotate clockwise in FIG. 2 about the axes of the pivots 47. Then, adjacent nozzle vanes 48 move in a direction to approach each other. As the nozzle vanes 48 move, an area in cross section of the nozzle path 31 or a channel of exhaust gas between the adjacent nozzle vanes 48 is made smaller. The direction of rotation of the arm 49 about the pivot 47 to narrow the cross sectional area of the nozzle path 31 will hereinafter be referred to as a closing direction.

In this way, through the rotation of the unison ring 52, the variable nozzle members 46 all rotate synchronously and the variable nozzle members 46 (more specifically, nozzle vanes 48) thus have an opening degree adjusted. The nozzle vanes 48 are opened/closed, and an area in cross section of a channel between the mutually adjacent nozzle vanes 48 is increased or decreased, so that the flow velocity of the exhaust gas blown to the turbine wheel 22 is controlled.

The variable nozzle mechanism 36 is configured including the variable nozzle members 46, the unison ring 52, the drive member 56, and the actuator 65. The arms 49 of the variable nozzle members 46 and the unison ring 52 are mutually coupled on a power transmission route from the actuator 65 to the arms 49, and so are the unison ring 52 and the drive arm 60 of the drive member 56, and the drive lever 58 of the drive member 56 and the output portion of the actuator 65.

Figure 3:
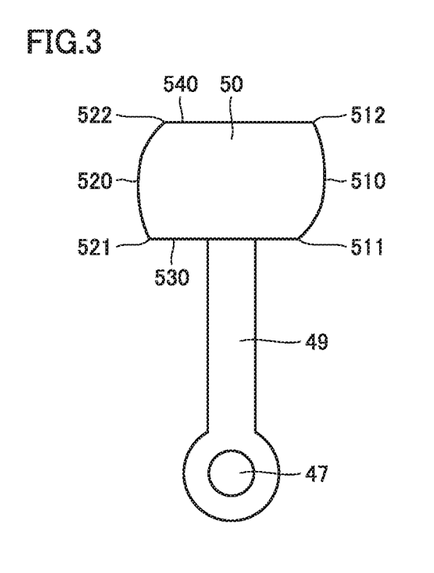
FIG. 3 is a schematic diagram showing a configuration of an arm of a variable nozzle member.

Hereinafter, a configuration of the arm 49 of the variable nozzle member 46 will be described. FIG. 3 is a schematic diagram showing a configuration of the arm 49 of the variable nozzle member 46. As has been described above, the arm 49 is fixed to the end of the pivot 47. The arm 49 is provided rotatably about the axis of the pivot 47. The fit-engagement portion 50 disposed in the arm fit-engagement groove 54 of the unison ring 52 is provided at the tip of the arm 49, the other side from the pivot 47.

The fit-engagement portion 50 has an external surface having a pair of contact surfaces, an inner surface 530, and an outer surface 540. The pair of contact surfaces have a closing-side contact surface 510 and an opening-side contact surface 520. The closing-side contact surface 510 and the opening-side contact surface 520 form convex curved surfaces which contact respective wall surfaces of the arm fit-engagement groove 54 in a state in which the fit-engagement portion 50 is fitted in the arm fit-engagement groove 54 of the unison ring 52. The closing-side contact surface 510 contacts a closing-side groove wall surface of the arm fit-engagement groove 54. The opening-side contact surface 520 contacts an opening-side groove wall surface of the arm fit-engagement groove 54. As shown in FIG. 2, the closing-side groove wall surface and the opening-side groove wall surface are formed parallel to each other with a spacing therebetween.

The closing-side contact surface 510 of the fit-engagement portion 50 is located on a frontward side in a direction in which the arm 49 rotates about the pivot 47 when the unison ring 52 is rotated in the direction of arrow Y2 indicated in FIG. 2 (i.e., the closing direction described above). The opening-side contact surface 520 of the fit-engagement portion 50 is located on a frontward side in a direction in which the arm 49 rotates about the pivot 47 when the unison ring 52 is rotated in the direction of arrow Y1 indicated in FIG. 2 (i.e., the opening direction described above).

The closing-side contact surface 510 is located on a frontward side in a direction in which the arm 49 rotates when moving to decrease an area in cross section of a channel of exhaust gas between adjacent nozzle vanes 48. The closing-side contact surface 510 is located on a rearward side in a direction in which the arm 49 rotates when moving to increase an area in cross section of a channel of exhaust gas between adjacent nozzle vanes 48.

The closing-side contact surface 510 has a proximal edge 511 which is a peripheral edge of the closing-side contact surface 510 closer to the pivot 47, and a distal edge 512 which is a peripheral edge of the closing-side contact surface 510 away from the pivot 47. The proximal edge 511 forms a boundary of the closing-side contact surface 510 and the inner surface 530. The distal edge 512 forms a boundary of the closing-side contact surface 510 and the outer surface 540.

The opening-side contact surface 520 is located on a frontward side in the direction in which the arm 49 rotates when moving to increase the area in cross section of the channel of exhaust gas between adjacent nozzle vanes 48. The opening-side contact surface 520 is located on a rearward side in the direction in which the arm 49 rotates when moving to decrease the area in cross section of the channel of exhaust gas between adjacent nozzle vanes 48.

The opening-side contact surface 520 has a proximal edge 521 which is a peripheral edge of the opening-side contact surface 520 closer to the pivot 47, and a distal edge 522 which is a peripheral edge of the opening-side contact surface 520 away from the pivot 47. The proximal edge 521 forms a boundary of the opening-side contact surface 520 and the inner surface 530. The distal edge 522 forms a boundary of the opening-side contact surface 520 and the outer surface 540.

The inner surface 530 is an external surface of the fit-engagement portion 50 located on an inner side in a radial direction of the nozzle ring 38 or the unison ring 52 in a state where the variable nozzle mechanism 36 shown in FIG. 2 has been assembled. The outer surface 540 is an external surface of the fit-engagement portion 50 located on an outer side in the radial direction of the nozzle ring 38 or the unison ring 52 in the state where the variable nozzle mechanism 36 shown in FIG. 2 has been assembled. The inner surface 530 and the outer surface 540 have a planar shape. The inner surface 530 and the outer surface 540 are provided parallel to each other.

The closing-side contact surface 510 and the opening-side contact surface 520 of the fit-engagement portion 50 have a curved surface. The closing-side contact surface 510 and the opening-side contact surface 520 both have a non-arcuate shape and do not have a fixed curvature. The closing-side contact surface 510 has a curvature which is the largest at the proximal edge 511, and from the proximal edge 511, gradually made smaller toward the distal edge 512, and is the smallest at the distal edge 512. The opening-side contact surface 520 has a curvature which is the largest at the distal edge 522, and from the distal edge 522, gradually made smaller toward the proximal edge 521, and is the smallest at the proximal edge 521.

The closing-side contact surface 510 has a radius of curvature gradually made larger from the proximal edge 511 toward the distal edge 512. The opening-side contact surface 520 has a radius of curvature gradually made larger from the distal edge 522 toward the proximal edge 521. The closing-side contact surface 510 has a curvature continuously made smaller as the surface is farther away from the pivot 47. The closing-side contact surface 510 has a curvature gradually decreased as the surface is farther away from the pivot 47. The opening-side contact surface 520 has a curvature continuously made larger as the surface is farther away from the pivot 47. The opening-side contact surface 520 a curvature gradually increased as the surface is farther away from the pivot 47.

The closing-side contact surface 510 has a smoothly continuing, continuously curved shape. The opening-side contact surface 520 has a smoothly continuing, continuously curved shape. The closing-side contact surface 510 and the opening-side contact surface 520 may have a shape of a curved surface selected from a group consisting of a cycloid, a hyperbolic spiral, a logarithmic spiral, an involute, and a clothoid, for example. The closing-side contact surface 510 and the opening-side contact surface 520 may be identical or different in shape.

Figure 4:
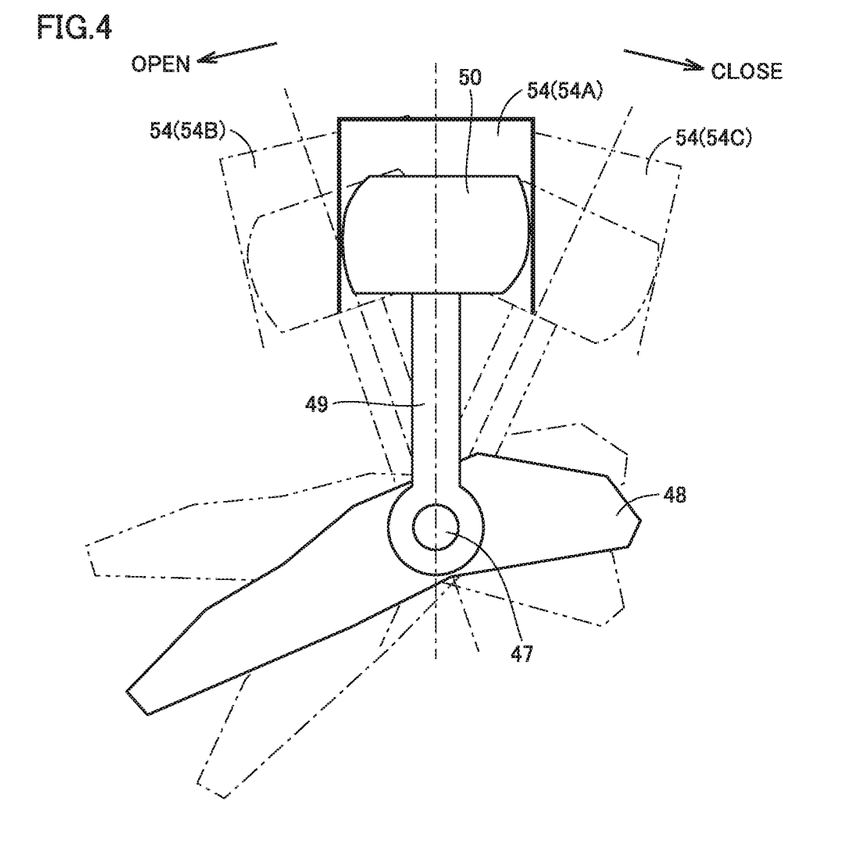
FIG. 4 is a schematic diagram showing a relationship between the arm's rotation and a nozzle vane's rotation.

FIG. 4 is a schematic diagram showing a relationship between rotation of the arm 49 and rotation of the nozzle vane 48. As the unison ring 52 rotates, the arm 49 accordingly rotates in opposite directions about the pivot 47. FIG. 4 shows an arm fit-engagement groove 54A, which indicates a position of the arm fit-engagement groove 54 accommodating the fit-engagement portion 50 of the arm 49 in a position in which the arm 49 has its centerline extending in the radial direction of the nozzle ring 38 or the unison ring 52. Note that in the present specification, a position of the arm 49 in which the centerline extends in the radial direction and the fit-engagement portion 50 is fitted in the arm fit-engagement groove 54A will be referred to as a reference position.

FIG. 4 shows an arm fit-engagement groove 54B, which indicates a position of the arm fit-engagement groove 54 accommodating the fit-engagement portion 50 of the arm 49 having rotated about the pivot 47 in a counterclockwise direction shown in FIG. 4 with reference to the reference position. An arm fit-engagement groove 54C indicates a position of the arm fit-engagement groove 54 accommodating the fit-engagement portion 50 of the arm 49 having rotated about the pivot 47 in a clockwise direction shown in FIG. 4 with reference to the reference position.

The nozzle vane 48 is coupled with the arm 49 via the pivot 47. The nozzle vane 48 is provided to be rotatable about the pivot 47 together with the arm 49.

The arm 49 and the nozzle vane 48 which are shown in FIG. 4 by a solid line show a position of the arm 49 and the nozzle vane 48 when the arm 49 is in the reference position. The arm 49 and the nozzle vane 48 which are shown in FIG. 4 by an alternate long and short dash line show a position of the arm 49 and the nozzle vane 48 when the arm 49 has rotated in a counterclockwise direction with reference to the reference position. The arm 49 and the nozzle vane 48 which are shown in FIG. 4 by a chain double-dashed line show a position of the arm 49 and the nozzle vane 48 when the arm 49 has rotated in a clockwise direction with reference to the reference position.

When the nozzle vane 48 shown in FIG. 4 by the alternate long and short dash line is compared with the nozzle vane 48 of the reference position, the former has a larger spacing from an adjacent nozzle vane 48. Accordingly, an area in cross section of a channel of exhaust gas between the adjacent nozzle vanes 48 is increased. When the nozzle vane 48 shown in FIG. 4 by the chain double-dashed line is compared with the nozzle vane 48 of the reference position, the former has a smaller spacing from an adjacent nozzle vane 48. Accordingly, an area in cross section of a channel of exhaust gas between the adjacent nozzle vanes 48 is decreased.

The arm 49 and the nozzle vane 48 are rotatable in a direction allowing exhaust gas's channel to be closed from the position indicated in FIG. 4 by the alternate long and short dash line to the position indicated in FIG. 4 by the chain double-dashed line. The arm 49 and the nozzle vane 48 are rotatable in a direction allowing exhaust gas's channel to be opened from the position indicated in FIG. 4 by the chain double-dashed line to the position indicated in FIG. 4 by the alternate long and short dash line.

Figure 5:
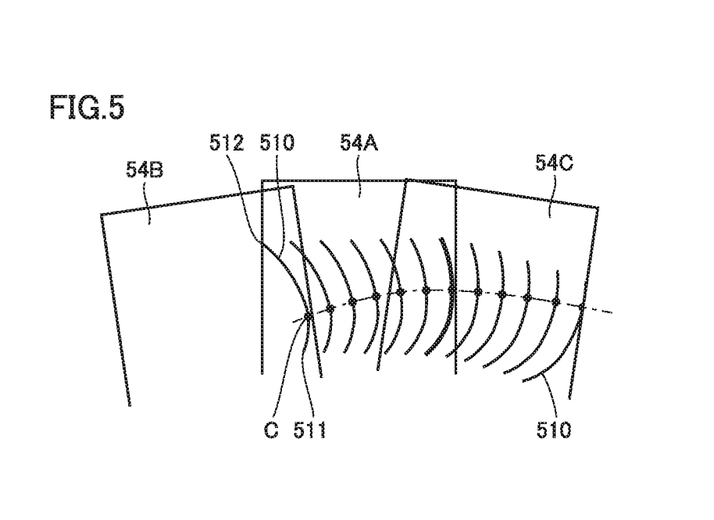
FIG. 5 is a schematic diagram showing a contact portion on a wall surface of an arm fit-engagement groove that a closing-side contact surface contacts when the arm rotates in a closing direction.

FIG. 5 is a schematic diagram showing a contact portion C on a wall surface of the arm fit-engagement groove 54 that the closing-side contact surface 510 contacts when the arm 49 rotates in the closing direction. For the sake of simplicity, FIG. 5 shows a contour of the closing-side contact surface 510 of the fit-engagement portion 50 of the arm 49 and a contour of the arm fit-engagement groove 54. FIG. 5 shows a black dot, which represents the contact portion C at a position on the wall surface (i.e., the closing-side groove wall surface) of the arm fit-engagement groove 54 which the closing-side contact surface 510 of the arm 49 rotating in the closing direction contacts.

FIG. 5 shows a movement of the contact portion C on the wall surface of the arm fit-engagement groove 54 when the arm 49 rotates from the position indicated by the alternate long and short dash line via the reference position to the position indicated by the chain double-dashed line, as shown in FIG. 4.

As shown in FIG. 5, when the fit-engagement portion 50 of the arm 49 is in the arm fit-engagement groove 54B, the contact portion C is present on the wall surface of the arm fit-engagement groove 54 at a position relatively close to the center of unison ring 52. As the arm 49 rotates in the closing direction, the position of the contact portion C moves radially outward. And when the fit-engagement portion 50 of the arm 49 is in the arm fit-engagement groove 54C, the contact portion C is present on the wall surface of the arm fit-engagement groove 54 at a position relatively far from the center of unison ring 52.

When the arm 49 rotates in the closing direction, the contact portion C at a position on the wall surface of the arm fit-engagement groove 54 which the closing-side contact surface 510 contacts is moving on the wall surface of the arm fit-engagement groove 54 in one way from an inner side toward an outer side in the radial direction of the unison ring 52. When the area in cross section of a channel of exhaust gas between adjacent nozzle vanes 48 is minimized, the contact portion C on the wall surface of the arm fit-engagement groove 54 contacts a vicinity of the distal edge 512 of the closing-side contact surface 510 having a smaller curvature.

As the arm 49 rotates in the closing direction, that is, as the area in cross section of the channel of exhaust gas decreases, a pressure of exhaust gas which acts on the nozzle vane 48 (i.e., a so-called exhaust reaction force) increases and biases the arm 49 in the closing direction. When the unison ring 52 pivots to a closing-side position, the exhaust reaction force presses the closing-side contact surface 510 of the arm 49 against the wall surface of the arm fit-engagement groove 54, and accordingly, the curvature of the closing-side contact surface 510 is smaller. As the force by the exhaust reaction force to bias the arm 49 increases, a contact area in which the closing-side contact surface 510 contacts the wall surface of the arm fit-engagement groove 54 increases. This suppresses an increase of a pressure which acts between the closing-side contact surface 510 and the wall surface of the arm fit-engagement groove 54.

In particular, when the unison ring 52 in the closed position moves in the opening direction, the arm fit-engagement groove 54 will cause the arm 49 that is biased in the closing direction by the exhaust reaction force to pivot in the opening direction, and a contact pressure of the closing-side contact surface 510 and the wall surface of the arm fit-engagement groove 54 increases. However, as the curvature of the closing-side contact surface 510 of the arm 49 is formed as described above, an increase of a pressure which acts between them can be suppressed effectively.

Note that a direction in which the exhaust reaction force acts on the nozzle vane 48 is determinable by the nozzle vane 48's shape, balance about the pivot, etc. Although the above has been described with an example in which exhaust reaction force acts in a direction to close nozzle vane 48, it is also possible to design the exhaust reaction force to act in a direction to open the nozzle vane 48. In that case, as the unison ring 52 pivots in the closing direction, the arm 49 will be biased by the exhaust reaction force in the opening direction, and the opening-side contact surface 520 of the arm fit-engagement portion 50 will be pressed against the wall surface of the arm fit-engagement groove 54. In that case, what is necessary is simply to make the curvature of the opening-side contact surface 520 of the arm fit-engagement portion 50 larger as the opening-side contact surface 520 is farther away from the pivot 47 (see the opening-side contact surface 520 in FIG. 3 and FIG. 4). In that case, a portion of the opening-side contact surfaces 520 of the arm fit-engagement portion 50 in the closing-side position, that contacts the wall surface of the arm fit-engagement groove 54 has a small curvature, which can suppress contact pressure.

Figure 6:
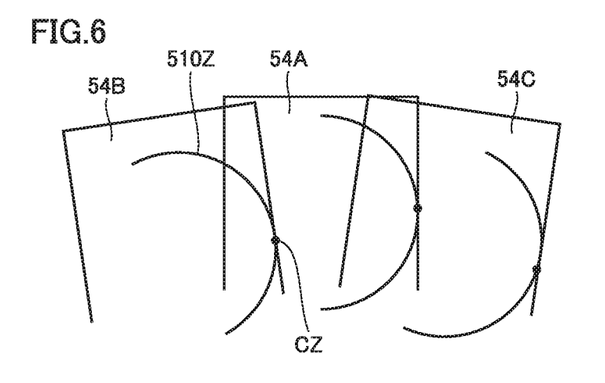
FIG. 6 is a schematic diagram showing a contact portion on a wall surface of an arm fit-engagement groove that a closing-side contact surface contacts when an arm of a comparative example rotates in the closing direction.

FIG. 6 is a schematic diagram showing a contact portion CZ on a wall surface of the arm fit-engagement groove 54 that a closing-side contact surface 510Z contacts when an arm of a comparative example rotates in the closing direction. The arm of the comparative example shown in FIG. 6 is different from the arm 49 of the above described embodiment in that the former has the closing-side contact surface 510Z in the form of an arcuate surface. FIG. 6 shows a black dot, which indicates the contact portion CZ at a position on the wall surface of the arm fit-engagement groove 54 which the closing-side contact surface 510Z contacts. FIG. 6 shows a movement of the contact portion CZ on the wall surface of the arm fit-engagement groove 54 when the arm 49 rotates from the position indicated by the alternate long and short dash line via the reference position to the position indicated by the chain double-dashed line, as shown in FIG. 4.

When the arm of the comparative example shown in FIG. 6 rotates in the closing direction, a distance which the contact portion CZ on the wall surface of the arm fit-engagement groove 54 travels is relatively smaller than a distance which the contact portion C of the embodiment travels.

When the arm of the comparative example rotates in the closing direction, the contact portion CZ on the wall surface of the arm fit-engagement groove 54 reciprocates in the radial direction of the unison ring 52. More specifically, when the arm of the comparative example rotates in the closing direction from a state in which its fit-engagement portion is in the arm fit-engagement groove 54B to the reference position, the contact portion CZ on the wall surface of the arm fit-engagement groove 54 is moving from an inner side toward an outer side in the radial direction of the unison ring 52. Subsequently when the arm of the comparative example rotates in the closing direction from the reference position to a state in which its fit-engagement portion is in the arm fit-engagement groove 54C, the contact portion CZ on the wall surface of the arm fit-engagement groove 54 is moving from the outer side toward the inner side in the radial direction of the unison ring 52.

The closing-side contact surface 510Z of the arm of the comparative example has an arcuate shape and accordingly, it has a uniform curvature. When the arm of the comparative example rotates about the pivot, the contact area in which the closing-side contact surface 510Z contacts the wall surface of the arm fit-engagement groove 54 does not numerically vary. Accordingly, as a resistance against the rotation of the arm of the comparative example increases, a pressure which acts between the closing-side contact surface 510Z and the wall surface of the arm fit-engagement groove 54 will increase.

Figure 7:
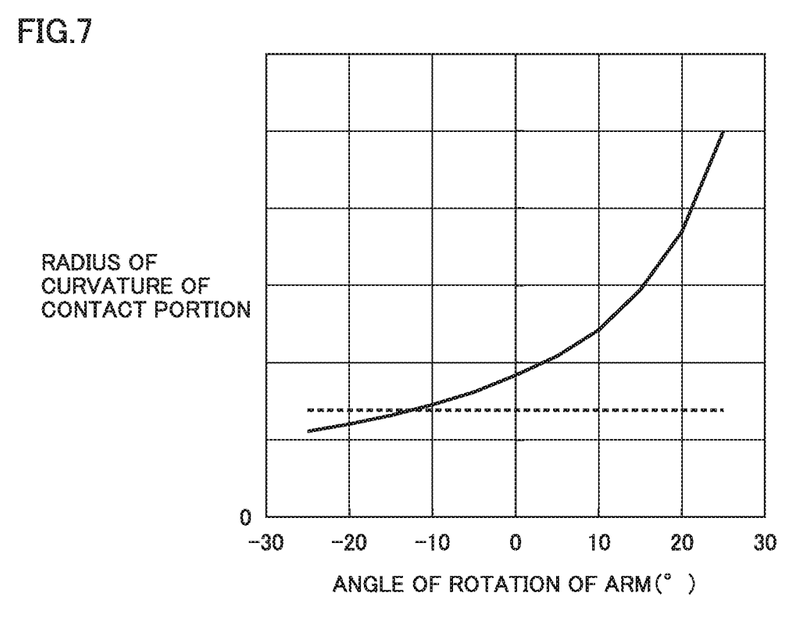
FIG. 7 is a graph which represents a relationship between an angle of rotation of the arm and a radius of curvature of the contact portion of the closing-side contact surface.

FIG. 7 is a graph which represents a relationship between an angle of rotation of each arm and a radius of curvature of the contact portion of the closing-side contact surface. In FIG. 7, the axis of abscissa represents an angle of rotation of each of the arm of the embodiment and that of the comparative example about a pivot. Let an angle of rotation when each arm is in the reference position be 0. Let an angle of rotation when each arm rotates in the closing direction with reference to the reference position be a positive angle of rotation. Let an angle of rotation when each arm rotates in the opening direction with reference to the reference position be a negative angle of rotation. In FIG. 7, the axis of ordinate represents a radius of curvature of the closing-side contact surface of the fit-engagement portion of each arm at a position at which it contacts the wall surface of the arm fit-engagement groove.

Figure 8:
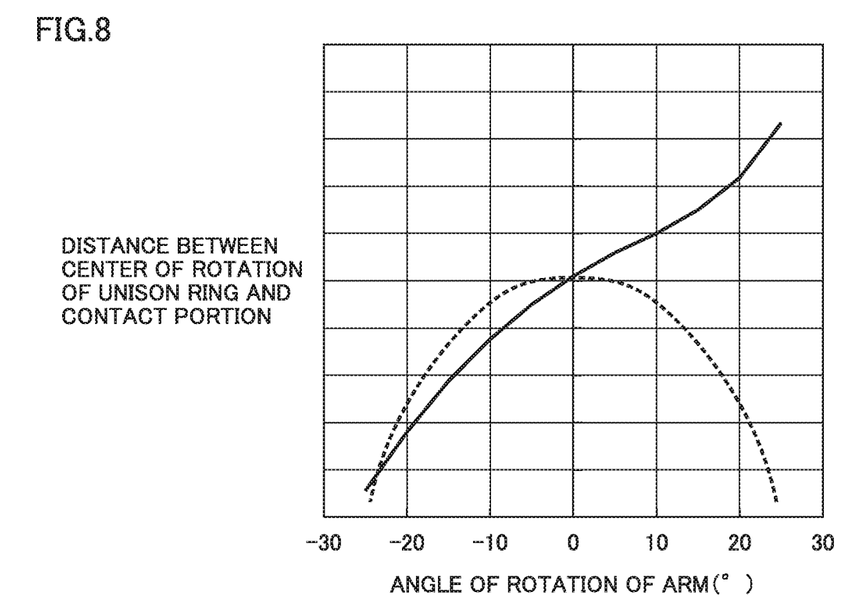
FIG. 8 is a graph which represents a relationship between an angle of rotation of the arm and a distance from the center of rotation of a unison ring to the contact portion.
Figure 9:
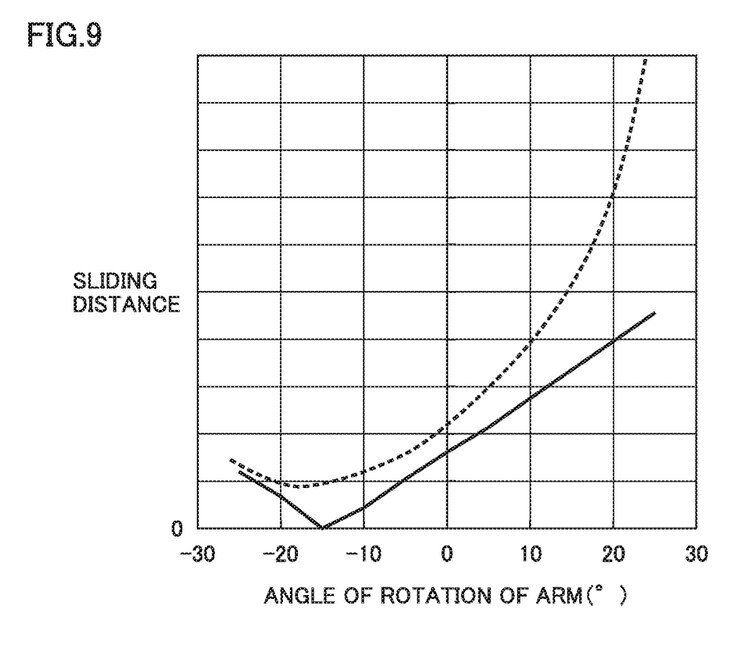
FIG. 9 is a graph which represents a relationship between an angle of rotation of the arm and a sliding distance of the contact portion relative to a wall surface of the arm fit-engagement groove.

In FIG. 7, and FIGS. 8 and 9 described later, a solid line represents a graph regarding the arm 49 of the embodiment, and a broken line represents a graph regarding the arm of the comparative example represented in FIG. 6.

As has been discussed above, as the arm 49 of the embodiment rotates in the closing direction, the curvature of the closing-side contact surface 510 becomes smaller. Since a radius of curvature is the reciprocal of a curvature, as shown in FIG. 7, as the angle of rotation of the arm 49 of the embodiment increases, the radius of curvature of the closing-side contact surface 510 becomes larger. In contrast, the closing-side contact surface 510Z of the arm of the comparative example has an arcuate shape, and when the arm rotates, the radius of curvature does not vary and has a fixed value.

As a result, when the angle of rotation of each arm represented in FIG. 7 is maximized, the radius of curvature of the closing-side contact surface 510 of the embodiment is twice or more of the radius of curvature of the closing-side contact surface 510Z of the comparative example. As has been discussed above, as the angle of rotation of the arm in the closing direction increases, a resistance against the rotation of the arm increases. The arm 49 of the embodiment is such that as a resistance against rotation of the arm 49 increases, the closing-side contact surface 510 becomes a shape more approximate to a plane. The arm 49 of the embodiment is such that as the angle of rotation of the arm 49 in the closing direction is made larger, an area of the closing-side contact surface 510 in contact with the wall surface of the arm fit-engagement groove 54 is made larger. Thus the arm 49 of the embodiment suppresses an increase of a pressure which acts between the closing-side contact surface 510 and the wall surface of the arm fit-engagement groove 54.

FIG. 8 is a graph which represents a relationship between an angle of rotation of each arm and a distance from the center of rotation of unison ring 52 to the contact portion. In FIG. 8, as well as in FIG. 7, the axis of abscissa represents an angle of rotation of each arm about the pivot. In FIG. 8, the axis of ordinate represents a distance between the center of the annular unison ring 52 and a contact portion between the closing-side contact surface of the fit-engagement portion of each arm and the wall surface of the arm fit-engagement groove.

As the arm 49 of the embodiment rotates in the closing direction, the contact portion C on the wall surface of the arm fit-engagement groove 54 is moving from an inner side toward an outer side in the radial direction of the unison ring 52 in one way. In contrast, when the arm of the comparative example rotates in the closing direction, the contact portion CZ on the wall surface of the arm fit-engagement groove 54 reciprocates in the radial direction of the unison ring 52.

The closing-side contact surface of the fit-engagement portion of the arm and the wall surface of the arm fit-engagement groove slide as the arm rotates. The arm 49 of the embodiment is such that a range of the wall surface of the arm fit-engagement groove 54 that slides relative to the closing-side contact surface 510 as the arm 49 rotates in the closing direction is larger. As in the comparative example, when the contact portion CZ on the wall surface of the arm fit-engagement groove 54 reciprocates, then the wall surface of the arm fit-engagement groove 54 will slide against the closing-side contact surface within a smaller range of the wall surface of the arm fit-engagement groove 54. Thus, in the embodiment, as compared with the comparative example, local sliding on the wall surface of the arm fit-engagement groove 54 is avoided.

FIG. 9 is a graph which represents a relationship between an angle of rotation of each arm and a sliding distance of the contact portion relative to a wall surface of the arm fit-engagement groove. In FIG. 9, as well as in FIG. 7, the axis of abscissa represents an angle of rotation of each arm about the pivot. In FIG. 9, the axis of ordinate represents a distance traveled by the closing-side contact surface as it slides on the wall surface of the arm fit-engagement groove while the arm rotates about the pivot by 5 degrees.

As has been described above, in the embodiment, when the arm 49 rotates in the closing direction, the contact portion C moves unidirectionally. In the comparative example, when the arm rotates in the closing direction, the contact portion CZ reciprocates. In the embodiment, when the arm has an angle of rotation in a positive range, the contact portion C moves on the wall surface of the arm fit-engagement groove 54 in the radial direction from an inner side toward an outer side, when a point which contact portion C contacts on the closing-side contact surface 510 moves from the side of the proximal edge 511 toward the side of the distal edge 512. In the comparative example, when the arm has an angle of rotation in a positive range, the contact portion CZ moves on the wall surface of arm fit-engagement groove 54 in the radial direction from an outer side toward an inner side, when a point which contact portion CZ contacts on the closing-side contact surface 510Z moves from the side of the proximal edge toward the side of the distal edge.

In the embodiment, when the arm has an angle of rotation in a positive range, a direction in which the contact portion C moves on the closing-side contact surface 510 and a direction in which the contact portion C moves on the wall surface of the arm fit-engagement groove 54 match. Accordingly, in the embodiment, a relative movement of the closing-side contact surface 510 relative to the wall surface of the arm fit-engagement groove 54 is a movement approximate to pure rolling. On the other hand, in the comparative example, when the arm has an angle of rotation in a positive range, a direction in which the contact portion CZ moves on the closing-side contact surface 510Z and a direction in which the contact portion CZ moves on the wall surface of the arm fit-engagement groove 54 are different. As a result, in the embodiment, as compared with the comparative example, sliding of the closing-side contact surface 510 against the wall surface of the arm fit-engagement groove 54 is significantly reduced.

Although there will also be a portion which overlaps the above description, the present embodiment's characteristic configurations will be enumerated below. The arm 49 of the present embodiment is provided rotatably about the pivot 47, as shown in FIG. 2. The arm fit-engagement groove 54 is formed in the unison ring 52. As shown in FIG. 3, the arm 49 has the closing-side contact surface 510 and the opening-side contact surface 520. The closing-side contact surface 510 and the opening-side contact surface 520 contact a wall surface of the arm fit-engagement groove 54. The closing-side contact surface 510 has a curvature made smaller as the surface is farther away from the pivot 47.

In the present embodiment, when the arm 49 rotates in the closing direction, as a resistance against the rotation of the arm 49 increases, a contact area in which the closing-side contact surface 510 contacts the wall surface of the arm fit-engagement groove 54 increases. This suppresses an increase of a pressure which acts between the closing-side contact surface 510 and the wall surface of the arm fit-engagement groove 54. Furthermore, sliding of the wall surface of the arm fit-engagement groove 54 with respect to the closing-side contact surface 510 when the arm 49 rotates in the closing direction, and sliding of the closing-side contact surface 510 with respect to the wall surface of the arm fit-engagement groove 54 when the arm 49 rotates in the closing direction, are reduced. Thus the present embodiment can reduce both wear on the closing-side contact surface 510 of the arm 49 and wear on the wall surface of the arm fit-engagement groove 54 in contact with the closing-side contact surface 510.

By optimizing the shape of the closing-side contact surface 510 of the arm 49, wear on the arm 49 and the unison ring 52 can be reduced, and a surface processing is not necessarily required such as forming a hard coating on a surface on which the arm 49 and the unison ring 52 slide. Thus, an increase in a cost accompanying the surface processing can be avoided, and a situation can be avoided in which wear advances rapidly when wear exceeding a coating's thickness occurs.

Furthermore, as shown in FIG. 3, the opening-side contact surface 520 has a curvature made larger as the surface is farther away from the pivot 47. The closing-side groove wall surface of the arm fit-engagement groove 54 that the closing-side contact surface 510 contacts and the opening-side groove wall surface of the arm fit-engagement groove 54 that the opening-side contact surface 520 contacts are formed in parallel, and an appropriate shape of the opening-side contact surface 520 can be selected to match the parallel wall surfaces of the arm fit-engagement groove 54.

Furthermore, as shown in FIG. 3, the closing-side contact surface 510 has a curvature continuously made smaller as the surface is farther away from the pivot 47. By forming the closing-side contact surface 510 to be a smooth curved surface, a local rapid increase of a contact area of the closing-side contact surface 510 and the wall surface of the arm fit-engagement groove 54 can be avoided, which can reliably reduce wear on the arm 49 and the arm fit-engagement groove 54.

Note that the arm 49 described with reference to FIG. 3 has the closing-side contact surface 510 and the opening-side contact surface 520 connected via the inner surface 530 and the outer surface 540 that are planar surfaces. The arm may not have a fit-engagement portion with a planar inner surface or a planar outer surface and may have a closing-side contact surface and an opening-side contact surface formed continuously.

While in the embodiment the shape of the closing-side contact surface 510 is optimized, the opening-side contact surface 520 may be formed to have a similar shape. In that case, a function and effect is achieved which can reduce wear on the wall surface of the arm fit-engagement groove 54, as sell as closing-side contact surface 510 described above.

While the present invention has been described in embodiments, it should be understood that the embodiments disclosed herein are illustrative and non-restrictive in any respect. The scope of the present invention is defined by the terms of the claims, and is intended to include any modifications within the meaning and scope equivalent to the terms of the claims.

What is claimed is:

1. A variable nozzle turbocharger which varies exhaust gas blown to a turbine wheel through a nozzle path, the variable nozzle turbocharger comprising:
   a plurality of nozzle vanes provided in the nozzle path;
   a plurality of arms each having a pivoted end and a free end, the pivoted end being integrally coupled with the nozzle vane by means of a pivot;
   a unison ring provided with a plurality of grooves each of which is engaged with the respective free end of the arm,
   wherein, when the unison ring rotates in both an opening direction to increase a cross sectional area of the nozzle path and a closing direction to decrease the cross sectional area of the nozzle path, the free end engaged with the groove of the unison ring rotates with the unison ring, and the arm and the nozzle vane rotate integrally about an axis of the pivot in the opening direction and the closing direction to vary the cross sectional area of the nozzle path,
   wherein the free end of the arm has a first contact surface on a side on which the arm rotates in the closing direction and a second contact surface on a side on which the arm rotates in the opening direction, the first contact surface and the second contact surface being each in contact with a respective one of paired walls forming the groove of the unison ring, both of the first contact surface and the second contact surface of the arm each forming a curved surface convexed toward a respective wall surface of the groove of the unison ring, the first contact surface having a first proximal edge and a first distal edge from the pivot, the second contact surface having a second proximal edge and a second distal edge from the pivot,
   wherein one of the first contact surface and the second contact surface having a curvature continuously made smaller from the proximal edge toward the distal edge from the pivot, and the other of the first contact surface and the second contact surface having a curvature continuously made larger from the proximal edge toward the distal edge from the pivot.

2. The variable nozzle turbocharger according to claim 1, wherein:
   the nozzle vane has a shape and balance about the pivot in which the exhaust gas's pressure acting on the nozzle vane in the closing direction decreases the nozzle path, and wherein the first contact surface has the curvature made smaller from the first proximal edge toward the first distal edge.

3. The variable nozzle turbocharger according to claim 1, wherein:
   the nozzle vane has a shape and balance about the pivot in which the exhaust gas's pressure acting on the nozzle vane in the opening direction increases the nozzle path, and wherein the second contact surface has the curvature continuously made larger from the second proximal edge toward the second distal edge.

* * * * *